United States Patent
Yakovleva et al.

(10) Patent No.: US 11,735,764 B2
(45) Date of Patent: Aug. 22, 2023

(54) PRINTABLE LITHIUM COMPOSITIONS

(71) Applicant: FMC Lithium USA Corp., Philadelphia, PA (US)

(72) Inventors: Marina Yakovleva, Gastonia, NC (US); Kenneth Brian Fitch, Cherryville, NC (US); William Arthur Greeter, Jr., Dallas, NC (US); Jian Xia, Belmont, NC (US)

(73) Assignee: Livent USA Corp., Philadelphia, PA (US)

(*) Notice: Subject to any disclaimer, the term of this patent is extended or adjusted under 35 U.S.C. 154(b) by 88 days.

(21) Appl. No.: 16/359,707

(22) Filed: Mar. 20, 2019

(65) Prior Publication Data

US 2020/0006760 A1  Jan. 2, 2020
US 2020/0243852 A9  Jul. 30, 2020

Related U.S. Application Data

(60) Provisional application No. 62/691,819, filed on Jun. 29, 2018, provisional application No. 62/646,521, filed on Mar. 22, 2018.

(51) Int. Cl.
*H01M 4/04* (2006.01)
*H01M 4/36* (2006.01)
(Continued)

(52) U.S. Cl.
CPC ........... *H01M 10/0562* (2013.01); *B22F 1/10* (2022.01); *B22F 1/103* (2022.01); *B22F 1/107* (2022.01);
(Continued)

(58) Field of Classification Search
CPC .. H01M 4/382; H01M 4/364; H01M 10/0525; H01M 4/0409; H01M 2004/027;
(Continued)

(56) References Cited

U.S. PATENT DOCUMENTS 3,721,113 A  3/1973 Hovespian
4,502,903 A  3/1985 Bruder
(Continued)

FOREIGN PATENT DOCUMENTS

CN  104332657 B  6/2016
JP  2004349164  12/2004
(Continued)

OTHER PUBLICATIONS

Tang et al., Glymes as Versatile Solvents for Chemical Reactions and Processes: from laboratory to Industry, RSC Adv. 2014, 4(22), 11251-11287. (Year: 2014).*

(Continued)

*Primary Examiner* — Christian Roldan
(74) *Attorney, Agent, or Firm* — Williams Mullen; F. Michael Sajovec (57) ABSTRACT

A printable lithium composition is provided. The printable lithium composition includes lithium metal powder; a polymer binder, wherein the polymer binder is compatible with the lithium powder; and a rheology modifier, wherein the rheology modifier is compatible with the lithium powder and the polymer binder. The printable lithium composition may further include a solvent compatible with the lithium powder and with the polymer binder.

18 Claims, 2 Drawing Sheets

(51) Int. Cl.

| | |
|---|---|
| *H01M 4/38* | (2006.01) |
| *H01M 4/60* | (2006.01) |
| *H01M 4/62* | (2006.01) |
| *H01M 4/02* | (2006.01) |
| *B22F 7/04* | (2006.01) |
| *C22C 26/00* | (2006.01) |
| *C22C 1/04* | (2023.01) |
| *C22C 1/10* | (2023.01) |
| *H01M 4/40* | (2006.01) |
| *H01M 10/0562* | (2010.01) |
| *H01M 10/0525* | (2010.01) |
| *H01M 4/134* | (2010.01) |
| *H01M 4/139* | (2010.01) |
| *H01M 4/1395* | (2010.01) |
| *H01M 4/485* | (2010.01) |
| *H01M 10/052* | (2010.01) |
| *H01M 10/0565* | (2010.01) |
| *H01M 10/0585* | (2010.01) |
| *B22F 1/10* | (2022.01) |
| *B22F 1/103* | (2022.01) |
| *B22F 1/107* | (2022.01) |

(52) U.S. Cl.
CPC ....... *H01M 4/0404* (2013.01); *H01M 4/0411* (2013.01); *H01M 4/0414* (2013.01); *H01M 4/134* (2013.01); *H01M 4/139* (2013.01); *H01M 4/1395* (2013.01); *H01M 4/364* (2013.01); *H01M 4/382* (2013.01); *H01M 4/485* (2013.01); *H01M 4/602* (2013.01); *H01M 4/622* (2013.01); *H01M 4/624* (2013.01); *H01M 10/052* (2013.01); *H01M 10/0525* (2013.01); *H01M 10/0565* (2013.01); *H01M 10/0585* (2013.01); *B22F 2301/054* (2013.01); *B22F 2302/40* (2013.01); *H01M 4/0409* (2013.01); *H01M 2004/027* (2013.01)

(58) Field of Classification Search
CPC .... H01M 4/587; H01M 4/625; H01M 4/0414; H01M 4/0407; H01M 4/0411; H01M 4/366; H01M 4/626; H01M 6/40; H01M 4/0404; H01M 4/622; H01M 4/405; H01M 4/1395; H01M 10/0562; H01M 4/04; H01M 4/36; H01M 4/38; H01M 4/62; H01M 4/0419; H01M 10/052; H01M 2300/0065; B22F 1/0059; B22F 2302/40; B22F 2001/0066; B22F 2301/054; B22F 2007/042; B22F 1/0074; B22F 3/20; B22F 3/22; C22C 2026/002; C22C 1/1026; C22C 1/0408; Y02E 60/10
USPC ........................................................ 429/231
See application file for complete search history.

(56) References Cited

U.S. PATENT DOCUMENTS

| | | | |
|---|---|---|---|
| 4,948,635 A | 8/1990 | Iwasaki | |
| 5,162,178 A * | 11/1992 | Ohsawa | H01M 4/602 |
| | | | 429/213 |
| 5,318,600 A | 6/1994 | Schlaikjer et al. | |
| 5,494,518 A | 2/1996 | Keane et al. | |
| 5,567,474 A | 10/1996 | Dover et al. | |
| 5,616,152 A * | 4/1997 | Velasquez | H01M 4/742 |
| | | | 29/623.5 |
| 5,976,403 A | 11/1999 | Dover et al. | |
| 6,232,014 B1 | 5/2001 | Shiota et al. | |
| 6,555,268 B1 | 4/2003 | Inoue et al. | |
| 6,706,447 B2 | 3/2004 | Gao et al. | |
| 7,588,623 B2 | 9/2009 | Dover et al. | |
| 7,765,949 B2 | 8/2010 | Fork | |
| 7,780,812 B2 | 8/2010 | Fork | |
| 7,851,083 B2 | 12/2010 | Zhu et al. | |
| 7,906,233 B2 | 3/2011 | Wang et al. | |
| 7,914,930 B2 | 3/2011 | Sato et al. | |
| 7,922,471 B2 | 4/2011 | Fork | |
| 8,021,496 B2 | 9/2011 | Yakovleva et al. | |
| 8,088,509 B2 | 1/2012 | Shen et al. | |
| 8,133,612 B2 | 3/2012 | Zou et al. | |
| 8,158,282 B2 | 4/2012 | Zhamu et al. | |
| 8,241,793 B2 | 8/2012 | Zhamu et al. | |
| 8,252,438 B2 | 8/2012 | Han et al. | |
| 8,276,695 B2 | 10/2012 | Han et al. | |
| 8,377,236 B2 | 2/2013 | Yakovleva et al. | |
| 8,778,522 B2 | 7/2014 | Visco et al. | |
| 8,980,477 B2 | 3/2015 | Gao et al. | |
| 9,385,397 B2 | 7/2016 | Zhamu et al. | |
| 9,437,370 B2 | 9/2016 | Chen et al. | |
| 9,515,321 B2 | 12/2016 | Yang et al. | |
| 9,627,908 B2 | 4/2017 | Kaminsky et al. | |
| 9,649,688 B2 | 5/2017 | Wietelmann et al. | |
| 9,666,850 B2 | 5/2017 | Visco et al. | |
| 9,711,297 B2 | 7/2017 | Raman et al. | |
| 9,755,241 B2 | 9/2017 | Zhamu et al. | |
| 9,780,358 B2 | 10/2017 | Masarapu et al. | |
| 9,837,659 B2 | 12/2017 | Balogh et al. | |
| 9,843,041 B2 | 12/2017 | Lopez et al. | |
| 9,893,379 B2 | 2/2018 | Yi et al. | |
| 9,923,195 B2 | 3/2018 | Amiruddin et al. | |
| 9,941,505 B2 | 4/2018 | Shen et al. | |
| 10,879,527 B2 | 12/2020 | Laramie et al. | |
| 2004/0002005 A1 * | 1/2004 | Gao | H01M 4/386 |
| | | | 429/231.95 |
| 2004/0188880 A1 | 9/2004 | Bauer et al. | |
| 2005/0130043 A1 | 6/2005 | Gao | |
| 2005/0239917 A1 * | 10/2005 | Nelson | C09D 11/03 |
| | | | 523/160 |
| 2006/0228468 A1 | 10/2006 | Lain et al. | |
| 2007/0006680 A1 * | 1/2007 | Dover | H01M 4/382 |
| | | | 75/331 |
| 2007/0190422 A1 | 8/2007 | Morris | |
| 2007/0275302 A1 | 11/2007 | Sotowa | |
| 2008/0274408 A1 | 11/2008 | Jarvis | |
| 2009/0035663 A1 * | 2/2009 | Yakovleva | H01M 4/1315 |
| | | | 429/231.95 |
| 2011/0135810 A1 * | 6/2011 | Yakovleva | H01M 4/1393 |
| | | | 252/182.1 |
| 2012/0094188 A1 | 4/2012 | Visco et al. | |
| 2012/0153211 A1 | 6/2012 | Fork | |
| 2012/0156364 A1 | 6/2012 | Fork | |
| 2013/0157106 A1 | 6/2013 | Lee et al. | |
| 2014/0186519 A1 | 7/2014 | Cobb | |
| 2014/0227432 A1 | 8/2014 | Liu et al. | |
| 2014/0342209 A1 | 11/2014 | He et al. | |
| 2014/0349185 A1 | 11/2014 | Momose | |
| 2015/0086869 A1 | 3/2015 | Wang et al. | |
| 2016/0028089 A1 | 1/2016 | Arpin et al. | |
| 2016/0301076 A1 | 10/2016 | Shen et al. | |
| 2016/0351893 A1 | 12/2016 | Wietelmann et al. | |
| 2017/0040605 A1 | 2/2017 | Hwang et al. | |
| 2017/0123443 A1 | 5/2017 | Kronmueller et al. | |
| 2017/0149052 A1 | 5/2017 | Yakovleva et al. | |
| 2017/0301485 A1 | 10/2017 | Cao et al. | |
| 2017/0365854 A1 | 12/2017 | Gopalakrishnannair et al. | |
| 2018/0013126 A1 | 1/2018 | Ivanov et al. | |
| 2018/0241079 A1 | 8/2018 | Duong et al. | |
| 2018/0269442 A1 | 9/2018 | Hsieh | |
| 2018/0269471 A1 | 9/2018 | Lopez et al. | |
| 2018/0358618 A1 | 12/2018 | Tour et al. | |

FOREIGN PATENT DOCUMENTS

| | | |
|---|---|---|
| JP | 2008503865 | 2/2008 |
| JP | 2010-160984 A | 7/2010 |
| JP | 2010160982 A | 7/2010 |
| JP | 2013065532 A | 4/2013 |
| JP | 2013243088 A | 12/2013 |
| JP | 2014120264 A | 6/2014 |

(56) References Cited

FOREIGN PATENT DOCUMENTS

| JP | 2014175080 A | 9/2014 |
|---|---|---|
| JP | 2016521907 | 7/2016 |
| JP | 2017-174805 A | 9/2017 |
| RU | 2352029 | 4/2009 |
| WO | 2011008744 | 1/2011 |
| WO | 2011008744 A1 | 1/2011 |
| WO | WO 2011/008744 A1 | 1/2011 |
| WO | 2017123443 | 7/2017 |
| WO | WO 2017/123443 A1 | 7/2017 |
| WO | 2018025036 | 2/2018 |

OTHER PUBLICATIONS

International Search Report/Written Opinion dated Jun. 26, 2019 in PCT/US2019/023376.
International Search Report/Written Opinion dated Jun. 24, 2019 in PCT/US2019/023383.
International Search Report/Written Opinion dated Jun. 26, 2019 in PCT/US2019/023390.
Mashtalir et al., High-Purity Lithium Metal Film from Aqueous Mineral Solutions, American Chemical Society (ACS) Omega 2018, vol. 3 pp. 181-187.
International Preliminary Report on Patentability for International Application No. PCT/US2019/023390, dated Sep. 22, 2020.
International Preliminary Report on Patentability for International Application No. PCT/US2019/023376, dated Sep. 22, 2020.
International Preliminary Report on Patentability for International Application No. PCT/US2019/023383, dated Sep. 22, 2020.
International Search Report / Written Opinion of the International Searching Authority dated Sep. 24, 2020 in PCT/US19/51705.
Office Action, U.S. Appl. No. 16/573,587, 10 pages, dated Oct. 4, 2021.
Office Action, JP 2021-500496, dated Dec. 12, 2021, 4 pages, English translation.
JP 2010-160982A, Jul. 22, 2010, Tanizaki Hiroaki et al., Machine translation.
JP 2013-065532A, Apr. 11, 2013, Teraki Kuniko et al., Machine translation.
JP 2013-243088A, Dec. 5, 2013, Shimoizumi Jun et al., Machine translation.
JP 2014-120264A, Jun. 30, 2014, Nakajima Mamoru et al., Machine translation.
JP 2014-175080A, Sep. 22, 2014, Shishihara Daisuke et al., Machine translation.
Office Action, JP 2021-500498, dated Dec. 9, 2021, 3 pages.
Office Action, JP 2021-500498, Dec. 9, 2021, 4 pages, English Translation.
Machine Translation of JP 2010-160984A.
Machine Translation of JP 2017-174805A.
Australian Government, IP Australia, Examination Report No. 1 for Standard Patent Application, Patent Application No. 2019240246, dated Aug. 26, 2021, 6 pages.
Bitsch, Boris et al., "A novel slurry concept for the fabrication of lithium-ion battery electrodes with beneficial properties", Journal of Power Sources, 2014, vol. 265, pp. 81-90 See 2. Experimental; 4. Conclusions; and Fig. 6.
First Examination Report of Indian Patent Application No. 202137045734, dated Oct. 25, 2022.
Yakovleva, Office Action, U.S. Appl. No. 16/573,556, dated Jun. 22, 2022, 15 pages.
National Institute of Industrial Property, Office Action for Brazilian Patent Application No. BR112020018894-8, dated Mar. 13, 2023.
United States Patent and Trademark Office, Office Action for U.S. Appl. No. 16/573,556, dated Jan. 12, 2023.
Japanese Patent Office, Office Action, JP Application No. 2021-500495, dated Dec. 16, 2022.
Intellectual Property Office Singapore, Office Action, SG Patent Application No. 11202108855W, dated Nov. 2, 2022.
Intellectual Property Office Singapore, Office Action, SG Patent Application No. 11202108854X, dated Nov. 2, 2022.
Japanese Patent Office, Office Action—Decision of Rejection for JP 2021-500495, dated May 19, 2023.
State of Israel Ministry of Justice; Office Action for International Patent Application No. IL 277178, dated Dec. 22, 2022.
Federal Industrial Property Institute, RU Search Report for RU Patent Application No. 2021130364, dated Mar. 30, 2023.

* cited by examiner

PRINTABLE LITHIUM COMPOSITIONS

RELATED APPLICATIONS

The following application claims priority to U.S. Provisional No. 62/646,521 filed Mar. 22, 2018, and U.S. Provisional No. 62/691,819 filed Jun. 29, 2018, the disclosures of which are incorporated by reference in their entireties.

FIELD OF THE INVENTION

The present invention relates to a printable lithium composition suitable for formation of electrodes suitable for use in a wide variety of energy storage devices, including batteries and capacitors.

BACKGROUND OF THE INVENTION

Lithium and lithium-ion secondary or rechargeable batteries have found use in certain applications such as in cellular phones, camcorders, and laptop computers, and even more recently, in larger power application such as in electric vehicles and hybrid electric vehicles. It is preferred in these applications that the secondary batteries have the highest specific capacity possible but still provide safe operating conditions and good cyclability so that the high specific capacity is maintained in subsequent recharging and discharging cycles.

Although there are various constructions for secondary batteries, each construction includes a positive electrode (or cathode), a negative electrode (or anode), a separator that separates the cathode and anode, an electrolyte in electrochemical communication with the cathode and anode. For secondary lithium batteries, lithium ions are transferred from the anode to the cathode through the electrolyte when the secondary battery is being discharged, i.e., used for its specific application. During the discharge process, electrons are collected from the anode and pass to the cathode through an external circuit. When the secondary battery is being charged, or recharged, the lithium ions are transferred from the cathode to the anode through the electrolyte.

Historically, secondary lithium batteries were produced using non-lithiated compounds having high specific capacities such as $TiS_2$, $MoS_2$, $MnO_2$, and $V_2O_5$, as the cathode active materials. These cathode active materials were coupled with a lithium metal anode. When the secondary battery was discharged, lithium ions were transferred from the lithium metal anode to the cathode through the electrolyte. Unfortunately, upon cycling, the lithium metal developed dendrites that ultimately caused unsafe conditions in the battery. As a result, the production of these types of secondary batteries was stopped in the early 1990s in favor of lithium-ion batteries.

Lithium-ion batteries typically use lithium metal oxides such as $LiCoO_2$ and $LiNiO_2$ as cathode active materials coupled with an active anode material such as a carbon-based material. It is recognized that there are other anode types based on silicon oxide, silicon particles and the like. In batteries utilizing carbon-based anode systems, the lithium dendrite formation on the anode is substantially avoided, thereby making the battery safer. However, the lithium, the amount of which determines the battery capacity, is totally supplied from the cathode. This limits the choice of cathode active materials because the active materials must contain removable lithium. Also, delithiated products corresponding to $Li_xCoO_2$, $Li_xNiO_2$ formed during charging and overcharging are not stable. In particular, these delithiated products tend to react with the electrolyte and generate heat, which raises safety concerns.

New lithium-ion cells or batteries are initially in a discharged state. During the first charge of lithium-ion cell, lithium moves from the cathode material to the anode active material. The lithium moving from the cathode to the anode reacts with an electrolyte material at the surface of the graphite anode, causing the formation of a passivation film on the anode. The passivation film formed on the graphite anode is a solid electrolyte interface (SEI). Upon subsequent discharge, the lithium consumed by the formation of the SEI is not returned to the cathode. This results in a lithium-ion cell having a smaller capacity compared to the initial charge capacity because some of the lithium has been consumed by the formation of the SEI. The partial consumption of the available lithium on the first cycle reduces the capacity of the lithium-ion cell. This phenomenon is called irreversible capacity and is known to consume about 10% to more than 20% of the capacity of a lithium ion cell. Thus, after the initial charge of a lithium-ion cell, the lithium-ion cell loses about 10% to more than 20% of its capacity.

One solution has been to use stabilized lithium metal powder to pre-lithiate the anode. For example, lithium powder can be stabilized by passivating the metal powder surface with carbon dioxide such as described in U.S. Pat. Nos. 5,567,474, 5,776,369, and 5,976,403, the disclosures of which are incorporated herein in their entireties by reference. The $CO_2$-passivated lithium metal powder can be used only in air with low moisture levels for a limited period of time before the lithium metal content decays because of the reaction of the lithium metal and air. Another solution is to apply a coating such as fluorine, wax, phosphorus or a polymer to the lithium metal powder such as described in U.S. Pat. Nos. 7,588,623, 8,021,496, 8,377,236 and U.S. Patent Publication No. 2017/0149052, for example.

There, however, remains a need for processes and compositions for applying lithium metal powder to various substrates to provide electrodes for lithium-ion cells and other lithium metal batteries.

SUMMARY OF THE INVENTION

To this end, the present invention provides a printable lithium composition that may be used to form or fabricate electrodes, and particularly for the formation or fabrication of anodes. An anode comprising the printable lithium composition will have increased efficiency. The composition will have improved stability, such as the composition having a sufficient shelf life of at least six months and be stable against loss of metallic lithium content particularly at elevated temperatures.

The printable lithium composition of the present invention comprises a lithium metal powder, a polymer binder, wherein the polymer binder is compatible with the lithium powder, and a rheology modifier compatible with the lithium powder and the polymer binder. A solvent may be included in the printable lithium composition, wherein the solvent is compatible with the lithium powder and compatible with (e.g., able to form suspension or dissolve in) the polymer binder. The solvent may be included as a component during the initial preparation of the printable lithium composition, or added later after the printable lithium composition is prepared.

The present invention also provides an anode formed by combining with, depositing or applying the printable lithium composition to an anode active material and a battery including such anode.

The present invention further provides an anode prelithiated by deposition or applying the printable lithium composition on the anode or substrate and a battery including such an anode.

DETAILED DESCRIPTION OF THE INVENTION

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items.

The term "about," as used herein when referring to a measurable value such as an amount of a compound, dose, time, temperature, and the like, is meant to encompass variations of 20%, 10%, 5%, 1%, 0.5%, or even 0.1% of the specified amount. Unless otherwise defined, all terms, including technical and scientific terms used in the description, have the same meaning as commonly understood by one of ordinary skill in the art to which this invention belongs.

As used herein, the terms "comprise," "comprises," "comprising," "include," "includes" and "including" specify the presence of stated features, integers, steps, operations, elements, and/or components, but do not preclude the presence or addition of one or more other features, integers, steps, operations, elements, components, and/or groups thereof.

As used herein, the term "consists essentially of" (and grammatical variants thereof), as applied to the compositions and methods of the present invention, means that the compositions/methods may contain additional components so long as the additional components do not materially alter the composition/method. The term "materially alter," as applied to a composition/method, refers to an increase or decrease in the effectiveness of the composition/method of at least about 20% or more.

All patents, patent applications and publications referred to herein are incorporated by reference in their entirety. In case of a conflict in terminology, the present specification is controlling.

In accordance with the present invention, a printable lithium composition for formation of an electrode is provided. In one embodiment, the printable lithium composition is electrochemically active and may be used to form an anode by applying or depositing the printable lithium composition on an anode conductive or carrier material (e.g., copper or polymer or ceramic films).

In another embodiment, the printable lithium composition may be applied or deposited to prelithiate an anode or cathode. The prelithiated anode or cathode may be incorporated into an energy storage device such as a capacitor or battery. The battery may be comprised of liquid electrolytes. In another embodiment, the battery may be comprised of solid electrolytes to form a solid-state battery. In another embodiment, the printable lithium composition may be used applied or deposited to form a monolithic lithium metal anode for use in a solid-state battery.

In yet another embodiment, the printable lithium composition may be applied or deposited so as to form a solid electrolyte for a solid-state battery, and includes combining the printable lithium composition with a polymer or ceramic material to form a solid electrolyte.

The printable lithium composition comprises a lithium metal powder, one or more polymer binders, one or more rheology modifiers and may further include a solvent or co-solvent. The polymer binder may be compatible with the lithium metal powder. The rheology modifier may be compatible with the lithium metal powder and the polymer binder. The solvent may be compatible with the lithium metal powder and with the polymer binder.

The lithium metal powder may be in the form of a finely divided powder. The lithium metal powder typically has a mean particle size of less than about 80 microns, often less than about 40 microns and sometimes less than about 20 microns. The lithium metal powder may be a low pyrophoricity stabilized lithium metal power (SLMP®) available from FMC Lithium Corp. The lithium metal powder may also include a substantially continuous layer or coating of fluorine, wax, phosphorus or a polymer or the combination thereof (as disclosed in U.S. Pat. Nos. 5,567,474, 5,776,369, and 5,976,403). Lithium metal powder has a significantly reduced reaction with moisture and air.

The lithium metal powder may also be alloyed with a metal. For example, the lithium metal powder may be alloyed with a Group I-VIII element. Suitable elements from Group IB may include, for example, copper, silver, or gold. Suitable elements from Group IIB may include, for example, zinc, cadmium, or mercury. Suitable elements from Group IIA of the Periodic Table may include beryllium, magnesium, calcium, strontium, barium, and radium. Elements from Group IIIA that may be used in the present invention may include, for example, boron, aluminum, gallium, indium, or thallium. Elements from Group IVA that may be used in the present invention may include, for example, carbon, silicon, germanium, tin, or lead. Elements from Group VA that may be used in the present invention may include, for example, nitrogen, phosphorus, or bismuth. Suitable elements from Group VIII B may include, for example, nickel, palladium, or platinum.

The polymer binder is selected so as to be compatible with the lithium metal powder. "Compatible with" or "compatibility" is intended to convey that the polymer binder does not violently react with the lithium metal powder resulting in a safety hazard. The lithium metal powder and the polymer binder may react to form a lithium-polymer complex, however, such complex should be stable at various temperatures. It is recognized that the amount (concentration) of lithium and polymer binder contribute to the stability and reactivity. The polymer binder may have a molecular weight of about 1,000 to about 8,000,000, and often has a molecular weight of 2,000,000 to 5,000,000. Suitable polymer binders may include one or more of poly(ethylene oxide), polystyrene, polyisobutylene, natural rubbers, butadiene rubbers, styrene-butadiene rubber, polyisoprene rubbers, butyl rubbers, hydrogenated nitrile butadiene rubbers, epichlorohydrin rubbers, acrylate rubbers, silicon rubbers, nitrile rubbers, polyacrylic acid, polyvinylidene chloride, polyvinyl acetate, ethylene propylene diene termonomer, ethylene vinyl acetate copolymer, ethylene-propylene copolymers, ethylene-propylene terpolymers, polybutenes. The binder may also be a wax.

The rheology modifier is selected to be compatible with the lithium metal powder and the polymer binder. The rheology modifier provides rheology properties such as viscosity and flow under shear conditions. The rheology modifier may also provide conductivity, improved capacity and/or improved stability/safety depending on the selection of the rheology modifier. To this end, the rheology modifier may be the combination of two or more compounds so as to provide different properties or to provide additive properties. Exemplary rheology modifiers may include one or more of carbon black, carbon nanotubes, graphene, silicon nanotubes, graphite, hard carbon and mixtures, fumed silica, titanium dioxide, zirconium dioxide and other Group IIA, IIIA, IVB, VB and VIA elements/compounds and mixtures or blends thereof. Other additives intended to increase lithium ion conductivity can be used; for example, electrochemical device electrolyte salts such as lithium perchlorate ($LiClO_4$), lithium hexafluorophosphate ($LiPF_6$), lithium nitrate ($LiNO_3$), lithium bis(oxalate) borate (LiBOB), and lithium trifluoromethanesulfonimide (LiTFSI).

Solvents compatible with lithium may include acyclic hydrocarbons, cyclic hydrocarbons, aromatic hydrocarbons, symmetrical ethers, unsymmetrical ethers, cyclic ethers, alkanes, sulfones, mineral oil, and mixtures, blends or cosolvents thereof. Examples of suitable acyclic and cyclic hydrocarbons include n-hexane, n-heptane, cyclohexane, and the like. Examples of suitable aromatic hydrocarbons include toluene, ethylbenzene, xylene, isopropylbenzene (cumene), and the like. Examples of suitable symmetrical, unsymmetrical and cyclic ethers include di-n-butyl ether, methyl t-butyl ether, tetrahydrofuran, glymes and the like. Commercially available isoparaffinic synthetic hydrocarbon solvents with tailored boiling point ranges such as Shell Sol® (Shell Chemicals) or Isopar® (Exxon) are also suitable.

The polymer binder and solvents are selected to be compatible with each other and with the lithium metal powder. In general, the binder or solvent should be non-reactive with the lithium metal powder or in amounts so that any reaction is kept to a minimum and violent reactions are avoided. The binder and solvent should be compatible with each other at the temperatures at which the printable lithium composition is made and will be used. Preferably the solvent (or co-solvent) will have sufficient volatility to readily evaporate from the printable lithium composition (e.g., in slurry form) to provide drying of the printable lithium composition (slurry) after application.

The components of the printable lithium composition may be mixed together as a slurry or paste to have a high concentration of solid. Thus the slurry/paste may be in the form of a concentrate with not all of the solvent necessarily added prior to the time of depositing or applying. In one embodiment, the lithium metal powder should be uniformly suspended in the solvent so that when applied or deposited a substantially uniform distribution of lithium metal powder is deposited or applied. Dry lithium powder may be dispersed such as by agitating or stirring vigorously to apply high sheer forces.

In another embodiment, a mixture of the polymer binder, rheology modifier, coating reagents, and other potential additives for the lithium metal powder may be formed and introduced to contact the lithium droplets during the dispersion at a temperature above the lithium melting point, or at a lower temperature after the lithium dispersion has cooled such as described in U.S. Pat. No. 7,588,623 the disclosure of which is incorporated by reference in its entirety. The thusly modified lithium metal may be introduced in a crystalline form or in a solution form in a solvent of choice. It is understood that combinations of different process parameters could be used to achieve specific coating and lithium powder characteristics for particular applications.

Conventional pre-lithiation surface treatments require compositions having very low binder content and very high lithium; for example, see U.S. Pat. No. 9,649,688 the disclosure of which is incorporated by reference in its entirety. However, embodiments of the printable lithium composition in accordance with the present invention can accommodate higher binder ratios, including up to 20 percent on dry basis. Various properties of the printable lithium composition, such as viscosity and flow, may be modified by increasing the binder and modifier content up to 50% dry basis without loss of electrochemical activity of lithium. Increasing the binder content facilitates the loading of the printable lithium composition and the flow during printing. For example, in one embodiment the printable lithium composition comprises about 70% lithium metal powder and about 30% polymer binder and rheology modifiers. In another embodiment, the printable lithium composition may comprise about 85% lithium metal powder and about 15% polymer binder and rheology modifiers.

An important aspect of printable lithium compositions is the rheological stability of the suspension. Because lithium metal has a low density of 0.534 g/cc, it is difficult to prevent lithium powder from separating from solvent suspensions. By selection of lithium metal powder loading, polymer binder and conventional modifier types and amounts, viscosity and rheology may be tailored to create the stable suspension of the invention. A preferred embodiment shows no separation at greater than 90 days. This can be achieved by designing compositions with very high zero shear viscosity in the range of $1\times10^4$ cps to $1\times10^7$ cps. It is however very important to the application process that the compositions, when exposed to shear, exhibit viscosity characteristics in the ranges claimed.

The resulting printable lithium composition preferably may have a viscosity at $10\ s^{-1}$ shear of about 20 to about 20,000 cps, and often a viscosity of about 100 to about 10,000 cps. At such viscosity, the printable lithium composition is a flowable suspension or gel. The printable lithium composition preferably has an extended shelf life at room temperature and is stable against metallic lithium loss at temperatures up to 60° C., often up to 120° C., and sometimes up to 180° C. The printable lithium composition may separate somewhat over time but can be placed back into suspension by mild agitation and/or application of heat.

In one embodiment, the printable lithium composition comprises on a solution basis about 5 to 50 percent lithium metal powder, about 0.1 to 20 percent polymer binder, about 0.1 to 30 percent rheology modifier and about 50 to 95 percent solvent. In one embodiment, the printable lithium composition comprises on a solution basis about 15 to 25 percent lithium metal powder, about 0.3 to 0.6 percent polymer binder having a molecular weight of 4,700,000, about 0.5 to 0.9 percent rheology modifier, and about 75 to 85 percent solvent. Typically, the printable lithium composition is applied or deposited to a thickness of about 10 microns to 200 microns prior to pressing. After pressing, the thickness can be reduced to between about 1 to 50 microns. Examples of pressing techniques are described, for example, in U.S. Pat. Nos. 3,721,113 and 6,232,014 which are incorporated herein by reference in their entireties.

In one embodiment, the printable lithium composition is deposited or applied to an active anode material on a current collector namely to form a prelithiated anode. Suitable active anode materials include graphite and other carbon-based materials, alloys such as tin/cobalt, tin/cobalt/carbon, silicon-carbon, variety of silicone/tin based composite compounds, germanium-based composites, titanium based composites, elemental silicon, and germanium. The anode materials may be a foil, mesh or foam. Application may be via spraying, extruding, coating, printing, painting, dipping, and spraying, and are described in co-pending US Patent Publication No. 2019/0214631 A1, related and incorporated herein by reference in its entirety.

Anodes prelithiated using the printable lithium composition may be incorporated into various types of batteries. For example, the prelithiated anodes may be incorporated into batteries as disclosed in U.S. Pat. Nos. 7,851,083, 8,088,509, 8,133,612, 8,276,695, and 9,941,505, which are incorporated herein by reference in their entireties. Printing the printable lithium composition on an anode material may be an alternative to smearing lithium as disclosed in U.S. Pat. No. 7,906,233 incorporated herein by reference in its entirety.

In one embodiment, the active anode material and the printable lithium composition are provided together and extruded onto the current collector (e.g., copper, nickel, etc.). For instance, the active anode material and printable lithium composition may be mixed and co-extruded together. Examples of active anode materials include graphite, graphite-SiO, graphite-SnO, SiO, hard carbon and other lithium ion battery and lithium ion capacitor anode materials. In another embodiment, the active anode material and the printable lithium composition are co-extruded to form a layer of the printable lithium composition on the current collector. The deposition of the printable lithium composition including the above extrusion technique may include depositing as wide variety patterns (e.g., dots, stripes), thicknesses, widths, etc. For example, the printable lithium composition and active anode material may be deposited as a series of stripes, such as described in US Publication No. 2014/0186519 incorporated herein by reference in its entirety. The stripes would form a 3D structure that would account for expansion of the active anode material during lithiation. For example, silicon may expand by 300 to 400 percent during lithiation. Such swelling potentially adversely affects the anode and its performance. By depositing the printable lithium as a thin stripe in the Y-plane as an alternating pattern between the silicon anode stripes, the silicon anode material can expand in the X-plane alleviating electrochemical grinding and loss of particle electrical contact. Thus, the printing method can provide a buffer for expansion. In another example, where the printable lithium formulation is used to form the anode, it could be co-extruded in a layered fashion along with the cathode and separator, resulting in a solid-state battery.

In one embodiment, the printable lithium composition may be applied to a substrate or a preformed anode by coating the substrate with a roller. One example is a gravure coating device, such as one described in U.S. Pat. No. 4,948,635 herein incorporated by reference in its entirety. In this example, a pair of spaced rollers support the substrate as it advances toward a gravure roller. A nozzle or bath is utilized to apply the coating material to the gravure roller while a doctor blade is utilized to remove excess coating from the gravure roller. The gravure roller contacts the substrate as it travels through the gravure roller to apply the printable lithium composition. The gravure roller can be designed to print various patterns on the surface of the substrate; for example, lines or dots.

In another embodiment, the printable lithium composition may be applied to a substrate by extruding the printable lithium composition onto the substrate from an extruder. One example of an extruder is described in U.S. Pat. No. 5,318,600 herein incorporated by reference in its entirety. In such an embodiment, high pressure forces the printable lithium composition through an extrusion nozzle to coat the exposed surface area of the substrate.

In another embodiment, the printable lithium composition may be applied to a substrate by printing the printable lithium composition onto the substrate. Slot die print heads may be used to print monolithic, stripe or other patterns of the printable lithium composition onto the substrate. One example of a compatible printer utilizing a slot die print head is described in U.S. Pat. No. 5,494,518 herein incorporated by reference in its entirety.

In another embodiment, a conventional carbon anode may be prelithiated by depositing the printable lithium composition on the carbon anode. This will obviate the problem associated with carbon anodes in which upon initial charging of the cell when lithium is intercalated into the carbon some irreversibility occurs due to some lithium and cell electrolyte being consumed resulting in an initial capacity loss.

In one embodiment, the printable lithium composition may be used to pre-lithiate an anode as described in U.S. Pat. No. 9,837,659 herein incorporated by reference in its entirety. For example, the method includes disposing a layer of printable lithium composition adjacent to a surface of a pre-fabricated/pre-formed anode. The pre-fabricated electrode comprises an electroactive material. In certain variations, the printable lithium composition may be applied to the carrier/substrate via a deposition process. A carrier substrate on which the layer of printable lithium composition may be disposed may be selected from the group consisting of: polymer films (e.g., polystyrene, polyethylene, polyethyleneoxide, polyester, polypropylene, polypolytetrafluoroethylene), ceramic films, copper foil, nickel foil, or metal foams by way of non-limiting example. Heat may then be applied to the printable lithium composition layer on the substrate or the pre-fabricated anode. The printable lithium composition layer on the substrate or the pre-fabricated anode may be further compressed together, under applied pressure. The heating, and optional applied pressure, facilitates transfer of lithium onto the surface of the substrate or anode. In case of transfer to the pre-fabricated anode, pressure and heat can result in mechanical lithiation, especially where the pre-fabricated anode comprises graphite. In this manner, lithium transfers to the electrode and due to favorable thermodynamics is incorporated into the active material.

In one embodiment, the printable lithium composition may be incorporated within the anode as described in US Publication No. 2018/0269471 herein incorporated by reference in its entirety. For example, the anode can comprise an active anode composition and the printable lithium composition, and any electrically conductive powder if present. In additional or alternative embodiments, the printable lithium composition is placed along the surface of the electrode. For example, the anode can comprise an active layer with an active anode composition and a printable lithium composition source layer on the surface of active layer. In an alternative configuration, the printable lithium composition source layer is between the active layer and a current collector. Also, in some embodiments, the anode can comprise printable lithium composition source layers on both surfaces of the active layer.

In one embodiment, the printable lithium composition may be incorporated into a three-dimensional electrode structure as described in US Publication No. 2018/0013126 herein incorporated by reference in its entirety. For example, the printable lithium composition may be incorporated into a three-dimensional porous anode, porous current collector or porous polymer or ceramic film, wherein the printable lithium composition may be deposited therein.

In some embodiments, an electrode prelithiated with the printable lithium composition can be assembled into a cell with the electrode to be preloaded with lithium. A separator can be placed between the respective electrodes. Current can be allowed to flow between the electrodes. For example, an anode prelithiated with the printable lithium composition of the present invention may be formed into a second battery such as described in U.S. Pat. No. 6,706,447 herein incorporated by reference in its entirety.

The cathode is formed of an active material, which is typically combined with a carbonaceous material and a binder polymer. The active material used in the cathode is preferably a material that can be lithiated. Preferably, non-lithiated materials such as $MnO_2$, $V_2O_5$, $MoS_2$, metal fluorides or mixtures thereof, Sulphur and sulfur composites can be used as the active material. However, lithiated materials such as $LiMn_2O_4$ and $LiMO_2$ wherein M is Ni, Co or Mn that can be further lithiated can also be used. The non-lithiated active materials are preferred because they generally have higher specific capacities, lower cost and broader choice of cathode materials in this construction that can provide increased energy and power over conventional secondary batteries that include lithiated active materials.

In one embodiment, the printable lithium composition may be used to prelithiate a capacitor, such as an anode in a lithium-ion capacitor as described in US Publication No. 2017/0301485 herein incorporated by reference. For example, the anode can be constructed using hard carbon, soft carbon or graphite. The anode may then be attached to a current collector before or during having a printable lithium composition layer coated on the top surface of the anode. The printable lithium composition may also be used to prelithiate an energy storage device such as a lithium-ion capacitor as described in U.S. Pat. No. 9,711,297 herein incorporated by reference in its entirety.

In one embodiment, the printable lithium composition may be used to prelithiate a hybrid battery/capacitor as described in US Publication No. 2018/0241079 herein incorporated by reference in its entirety. The term "hybrid electrode" refers to an electrode that includes both battery electrode materials and capacitor electrode materials. In one embodiment, the hybrid cathode may comprise a blend of higher energy materials, such as battery cathode materials, and high power materials, such as capacitor cathode materials. For example, lithium-ion battery cathode materials may be combined with ultracapacitor or supercapacitor cathode materials. To complete the hybrid lithium-ion cell assembly, the hybrid cathode may be disposed against an anode electrode with a polyolefin separator in between the electrodes and is placed in a confined packaging, such as an energy storage device container, e.g. housing. The electrode stack is filled and contacted with a suitable electrolyte, such as a solvent containing a lithium-ion electrolyte salt and optionally including an electrolyte additive. The energy storage device package can be sealed.

The anode used in combination with the hybridized cathode can comprise elemental metal, such as elemental lithium. A method for prelithiation is direct addition of the printable lithium composition to the electrode formulation. This printable lithium composition uniformly integrated into the electrode formulation can then be used to form an electrode film, in a dry process, which can then be laminated onto a current collector, such as a metal foil, to form the electrode, such as an anode. The printable lithium composition can be also applied to the current collector prior to the lamination with the dry electrode. Embodiments herein can allow for a homogenous, and in some embodiments, dry, and/or particulate material, to be used as a raw material in the anode and hybridized cathode. Some embodiments herein can avoid the need for two separate layers on each electrode (such as a "battery material" layer and a "capacitor material" layer), which can avoid the need to introduce manufacturing complexity and added production cost. In further embodiments, the pre-doped electrode is a hybrid cathode. It will be understood that the elemental metal and related concepts described herein with respect to an energy storage device with lithium may be implemented with other energy storage devices, and other metals.

In another embodiment, the printable lithium composition may be applied or deposited to prelithiate an anode or cathode of a solid-state battery. For example, the printable lithium composition may be used to form a monolithic lithium metal anode for use in a solid-state battery, including solid-state batteries as described in U.S. Pat. Nos. 8,252,438 and 9,893,379 and incorporated herein by reference in their entireties.

In another embodiment, the printable lithium composition may be used to form or in conjunction with a solid electrolyte for use in a solid-state battery. For instance, the printable lithium composition may be deposited on a variety of solid-state electrolytes as described in U.S. Pat. No. 7,914,930 herein incorporated by reference in its entirety. One example of a solid-state secondary battery may include a positive electrode capable of electrochemically absorbing and desorbing lithium; a negative electrode capable of electrochemically absorbing and desorbing lithium, the negative electrode including an active material layer that comprises an active material, the active material layer being carried on a current collector; and a non-aqueous electrolyte. A method includes the steps of: reacting lithium with the active material of the negative electrode by bringing the printable lithium composition into contact with a surface of the active material layer of the negative electrode; and thereafter combining the negative electrode with the positive electrode to form an electrode assembly.

The following examples are merely illustrative of the invention and are not limiting thereon.

EXAMPLES

Example 1

Figure 2:
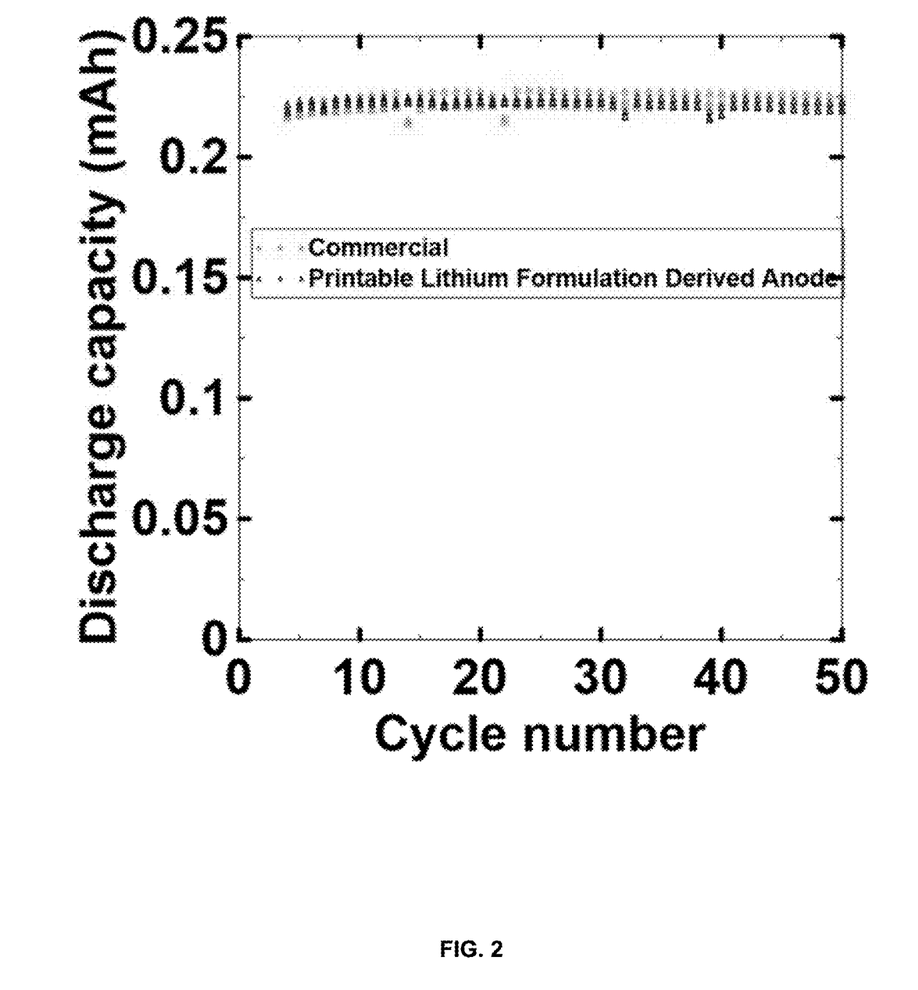
FIG. 2 is a plot showing the cycle performance for a pouch cell with printable lithium derived thin lithium film as the anode vs. commercial thin lithium foil.

10 g of solution styrene butadiene rubber (S-SBR Europrene Sol R 72613) is dissolved in 90 g toluene (99% anhydrous, Sigma Aldrich) by stirring at 21° C. for 12 hours. 6 g of the 10 wt % SBR (polymer binder) in toluene (solvent) is combined with 0.1 g carbon black (Timcal Super P) (rheology modifier) and 16 g of toluene and dispersed in a Thinky ARE 250 planetary mixer for 6 minutes at 2000 rpm. 9.3 g of stabilized lithium metal powder (SLMP®, FMC Lithium Corp.) having polymer coating of 20 to 200 μm and d50 of 20 μm is added to this suspension and dispersed for 3 minutes at 1000 rpm in a Thinky mixer. The printable lithium is then filtered through 180 μm opening stainless steel mesh. The printable lithium suspension is then doctor blade coated on to a copper current collector at a wet thickness of 2 mil (~50 μm). FIG. 2 is a plot showing the cycle performance for a pouch cell with printable lithium derived thin lithium film as the anode vs. commercial thin lithium foil.

Example 2

10 g of 135,000 molecular weight ethylene propylene diene terpolymer (EPDM) (Dow Nordel IP 4725P) is dissolved in 90 g p-xylene (99% anhydrous, Sigma Aldrich) by stirring at 21° C. for 12 hours. 6 g of the 10 wt % EPDM (polymer binder) in p-xylene (solvent) is combined with 0.1 g TiO2 (Evonik Industries) (rheology modifier) and 16 g of toluene and dispersed in a Thinky ARE 250 planetary mixer for 6 minutes at 2000 rpm. 9.3 g of stabilized lithium metal powder (SLMP®, FMC Lithium Corp.) having polymer coating of 20 to 200 μm and d50 of 20 μm is added to this suspension and dispersed for 3 minutes at 1000 rpm in a Thinky mixer. The printable lithium is then filtered through 180 μm opening stainless steel mesh. The printable lithium composition is then doctor blade coated on to a copper current collector at a wet thickness of 2 mil (~50 μm).

Shelf Life Stability

Figure 1:
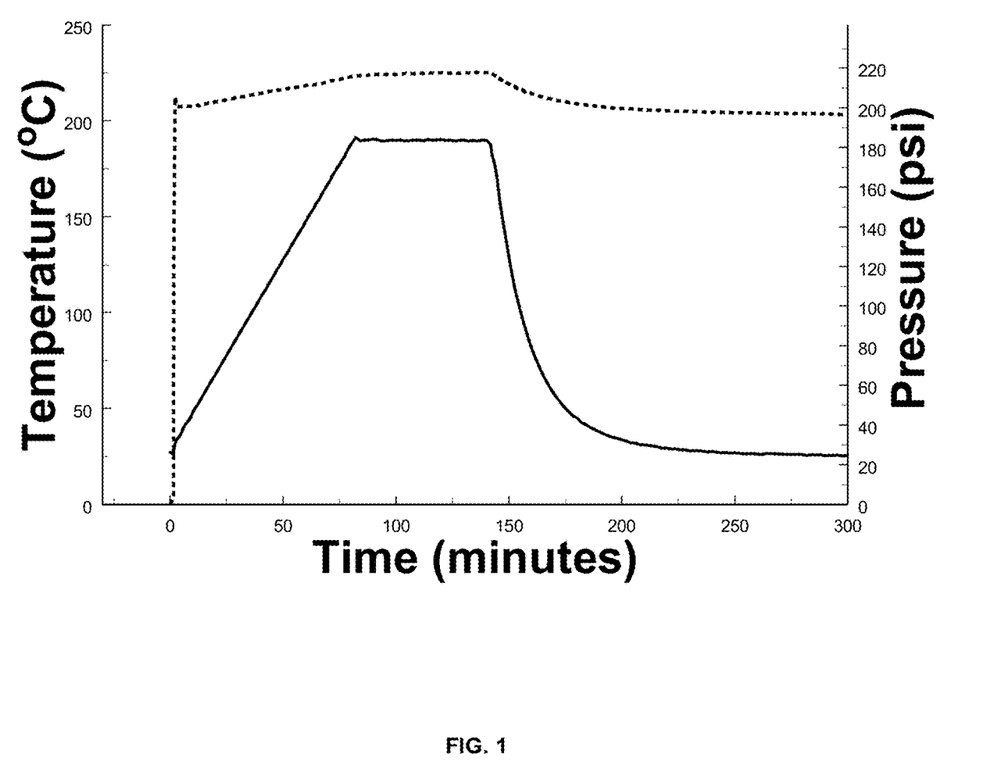
FIG. 1 is a temperature and pressure profile for the reactivity testing of SLMP/styrene butadiene/toluene printable lithium composition.

Printable lithium components must be selected to ensure chemical stability for long shelf life at room temperature and stability at elevated temperature for shorter durations such as during transport or during the drying process. The printable lithium composition stability was tested using calorimetry. 1.5 g SLMP was added to a 10 ml volume Hastelloy ARC bomb sample container. 2.4 g of 4% SBR binder solution was added to the container. The container was fitted with a 24-ohm resistance heater and a thermocouple to monitor and control sample temperature. The bomb sample set-up was loaded into a 350 ml containment vessel along with insulation. An Advance Reactive Screening Systems Tool calorimeter by Fauske Industries was used to assess the compatibility of the printable lithium solutions during a constant rate temperature ramp to 190° C. The temperature ramp rate was 2° C./min and the sample temperature was held at 190° C. for 60 minutes. The test was conducted under 200 psi Argon pressure to prevent boiling of the solvent. FIG. 1 shows the temperature and pressure profiles for the reactivity testing of a SLMP/styrene butadiene/toluene printable lithium composition.

Printing Performance

The quality of the printable lithium composition with regard to printability is measured by several factors, for example, consistency of flow which directly impact one's ability to control lithium loading on a substrate or an electrode surface. An effective means of measuring flow is Flow Conductance which is an expression of the loading per square centimeter in relation to the factors which control the loading—the pressure during extrusion and the speed of the printer head. It can most simply be thought of as the inverse of flow resistance.

The expression is used to allow comparisons between prints of varying pressures and speeds, and changes in Flow Conductance can alert one to non-linear relationships of flow with pressure. These are important for scaling the loading for a printable lithium up or down depending on the need of the anode or cathode. An ideal printable lithium composition would behave in a linear fashion to changes in extrusion pressure.

To test printability, a printable lithium composition is filtered through 180 μm opening stainless steel mesh and loaded into a Nordson EFD 10 ml syringe. The syringe is loaded into a Nordson EFD HP4x syringe dispenser and attached to a slot die print head. The slot die print head is equipped with a 100 μm-300 μm thick shim with channel openings designed to deliver the desired printable lithium composition loading. The slot die head is mounted on a Loctite 300 Series robot. The print head speed is set to 200 mm/s and the printing pressure is between 20 and 200 psi argon, depending on shim and channel design. The print length is 14 cm. In an example printing trial experiment, the printable lithium composition was printed 30 times from a single syringe at dispenser settings ranging from 80 psi to 200 psi. For this print trial experiment, the flow conductance average was $$0.14 \frac{mg}{s * cm^2} * \frac{lbf}{in^2}$$

with standard deviation of 0.02. Although this printable composition does not behave in a perfectly linear fashion, the composition flow response to changes in dispenser pressure is predictable to allow one skilled in the art to fine tune lithium loading to the desired level. Thus, at fixed dispenser pressure conditions the loading of lithium can be controlled very consistently. For example, for a print of $$0.275 \frac{mAh}{cm^2}$$

lithium metal, the CV is about 5%.

Electrochemical Testing

The pre-lithiation effect of printable lithium composition can be evaluated by printing the required amount of printable lithium onto the surface of prefabricated electrodes. The pre-lithiation lithium amount is determined by testing the anode material in half-cell format and calculating the lithium required to compensate for the first cycle losses due to formation of SEI, or other side reactions. To calculate the necessary amount of printable lithium, the capacity as lithium metal of the composition must be known and is approximately 3600 mAh/g dry lithium basis for the compositions used as examples.

The pre-lithiation effect is tested using Graphite-SiO/NCA pouch cells. The Graphite-SiO anode sheet has the following formulation: artificial graphite (90.06%)+SiO (4.74%)+carbon black (1.4%)+SBR/CMC (3.8%). The capacity loading of the electrode is 3.59 mAh/cm² with 87% first cycle CE (columbic efficiency). The printable lithium is applied onto a Graphite-SiO anode at 0.15 mg/cm² lithium metal. The electrode is dried at 80° C. for 100 min followed by lamination at a roller gap approximately 75% of the thickness of the electrode. A 7 cm×7 cm electrode is punched from the printable lithium treated anode sheet. The positive electrode has the following formulation: NCA (96%)+carbon black (2%)+PVdF (2%). The positive electrode is 6.8 cm×6.8 cm with capacity loading of 3.37 mAh/cm². The NCA cathode has 90% first cycle CE. The anode to cathode capacity ratio is 1.06 and the baseline for full cell first cycle CE is 77%. Single layer pouch cells are assembled and 1M LiPF$_6$/EC+DEC (1:1) is used as the electrolyte. The cells are pre-conditioned for 12 hours at 21° C. and then the formation cycle is conducted at 40° C. The formation protocol is 0.1 C charge to 4.2V, constant voltage to 0.01 C and 0.1 C discharge to 2.8V. In the described test 89% first cycle CE was demonstrated.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

That which is claimed is:

1. A composition comprising on a solution basis of:
   a) about 10 to about 50 percent of a lithium metal powder;
   b) about 0.1 to about 20 percent of a polymer binder, wherein the polymer binder is compatible with the lithium metal powder and is selected from the group consisting of unsaturated elastomers, saturated elastomers, polyacrylic acid, polyvinylidene chloride and polyvinyl acetate;
   c) about 0.1 to about 30 percent of a rheology modifier, wherein the rheology modifier is compatible with the lithium metal powder and the polymer binder; and
   d) about 50 to about 95 percent of a non-polar solvent, wherein the solvent is compatible with the lithium metal powder and with the polymer binder and wherein the solvent is selected from the group consisting of acyclic hydrocarbons, cyclic hydrocarbons, and aromatic hydrocarbons, wherein the composition is printable.

2. The printable lithium composition of claim 1, wherein the lithium metal powder is a stabilized lithium metal powder.

3. The printable lithium composition of claim 1 wherein the lithium metal powder is alloyed with a metal selected from the group consisting of aluminum, boron, germanium, silicon, indium, and magnesium.

4. The printable lithium composition of claim 1, comprising a viscosity of the printable lithium composition at 10 s⁻¹ shear of about 20 to about 20,000 cps.

5. The printable lithium composition of claim 1, wherein the printable lithium composition is chemically stable for up to six months at room temperature and is stable against metallic lithium loss at temperatures up to about 60° C.

6. The printable lithium composition of claim 1, wherein the rheology modifier is a conductive material.

7. The printable lithium composition of claim 6, wherein the conductive material is selected from the group consisting of carbon black, carbon nanotubes, and graphene.

8. The printable lithium composition of claim 1, wherein the rheology modifier provides improved stability.

9. The printable lithium composition of claim 1, wherein the polymer binder has a molecular weight of 1,000 to 8,000,000.

10. The solid-state battery of claim 9, wherein the saturated elastomer is selected from the group consisting of ethylene propylene diene monomer rubber and ethylene-vinyl acetate.

11. An anode comprising the printable lithium composition of claim 1.

12. A printable lithium composition comprising:
    on a solution basis of:
    a) about 10 to about 50 percent of a lithium metal powder;
    b) about 0.1 to about 20 percent of a polymer binder, wherein the polymer binder is compatible with the lithium metal powder and is selected from the group consisting of unsaturated elastomers, saturated elastomers, polyacrylic acid, polyvinylidene chloride and polyvinyl acetate;
    c) about 0.1 to about 30 percent of a rheology modifier, wherein the rheology modifier is compatible with the lithium metal powder and the polymer binder; and
    d) about 50 to about 95 percent of a solvent selected from the group consisting of acyclic hydrocarbons, cyclic hydrocarbons and aromatic hydrocarbons;
    wherein the composition is printable and is stable against metallic lithium loss at temperatures up to about 60° C.

13. The printable lithium composition of claim 12, wherein the lithium metal powder is a stabilized lithium metal powder.

14. The printable lithium composition of claim 12, wherein the rheology modifier is a conductive material.

15. The printable lithium composition of claim 14, wherein the conductive material is selected from the group consisting of carbon black, carbon nanotubes, and graphene.

16. The printable lithium composition of claim 12, wherein the polymer binder has a molecular weight of 1,000 to 8,000,000.

17. The printable lithium composition of claim 12, wherein the printable lithium composition has a viscosity of 10 s⁻¹ shear of about 20 to about 20,000 cps.

18. The printable lithium composition of claim 17, wherein the printable lithium composition is chemically stable for up to six months at room temperature.

* * * * *